Aug. 20, 1957 R. W. KENNEY 2,803,263
FLUID ACTUATED CONTROL MEANS
Filed Dec. 6, 1952 4 Sheets-Sheet 1
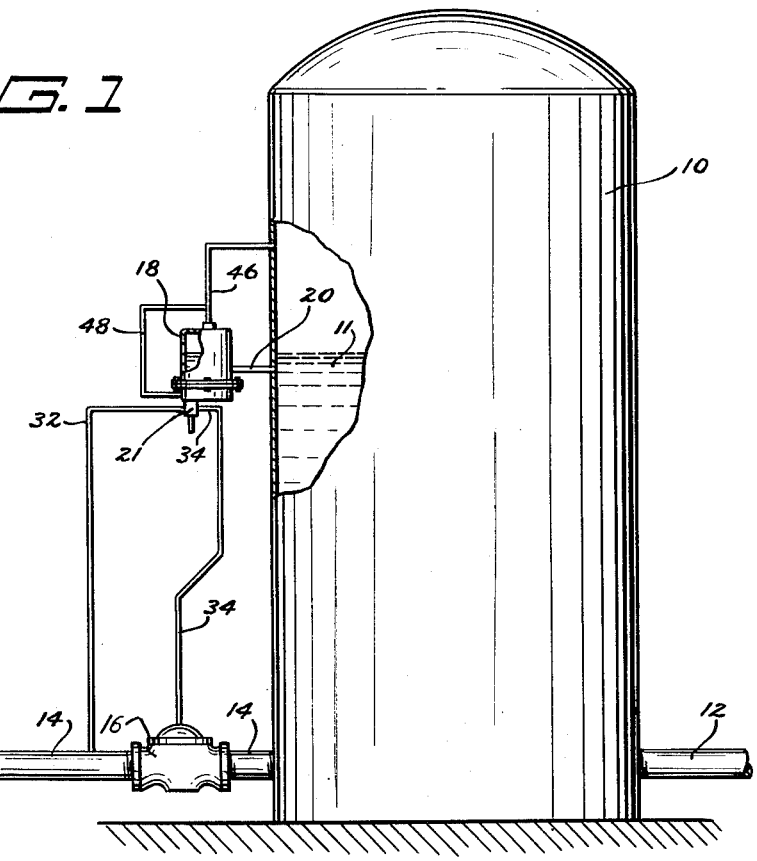
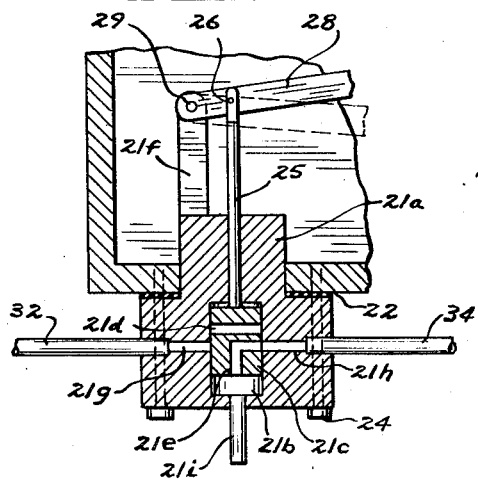
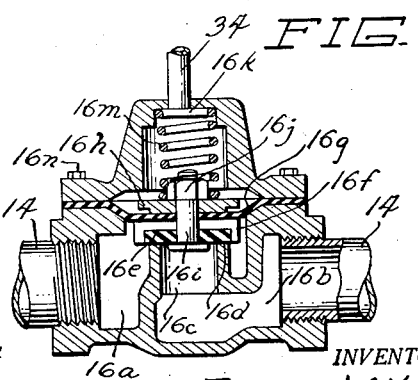
INVENTOR.
ROBERT W. KENNEY
BY
Chas. C. Reif
ATTORNEY

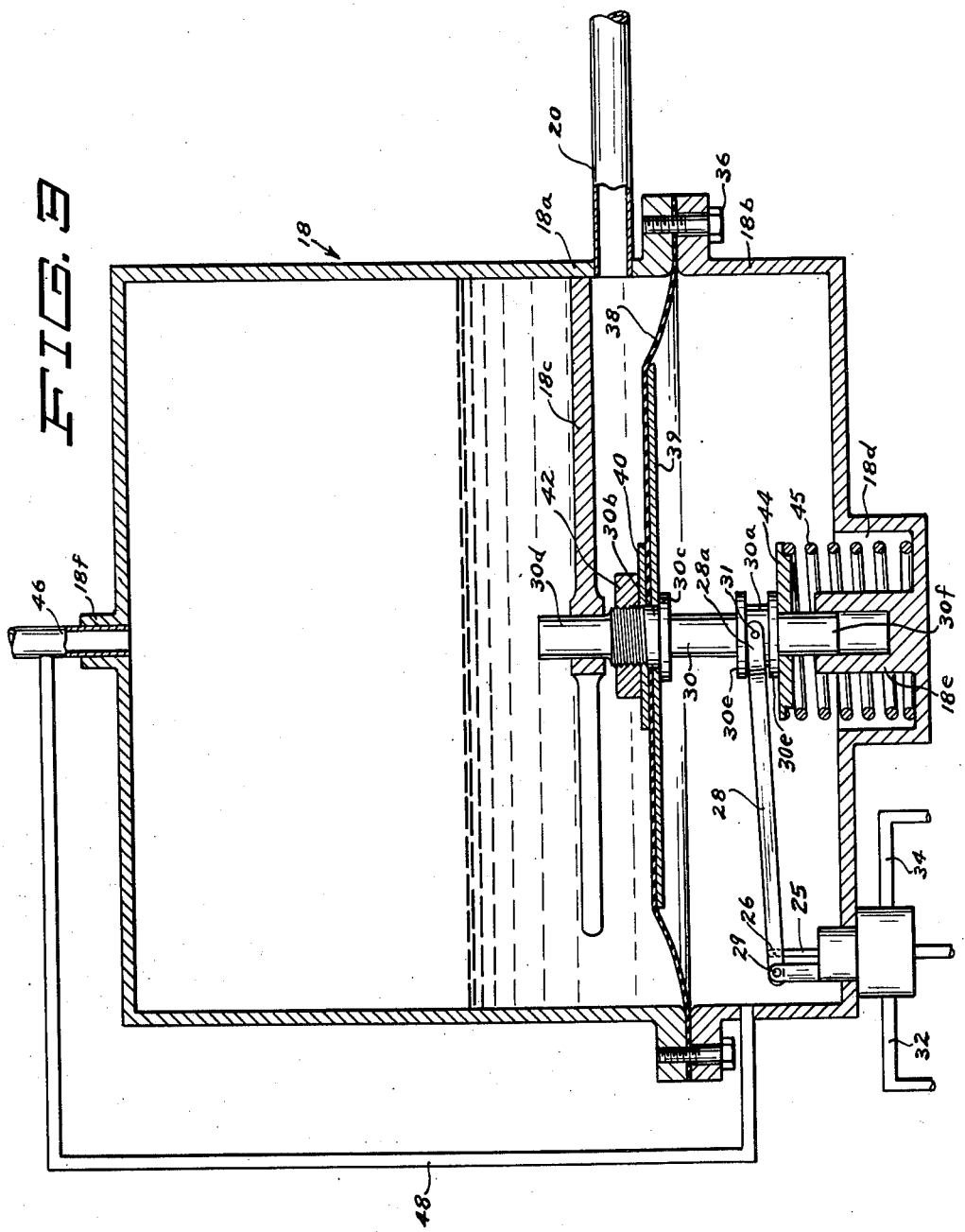

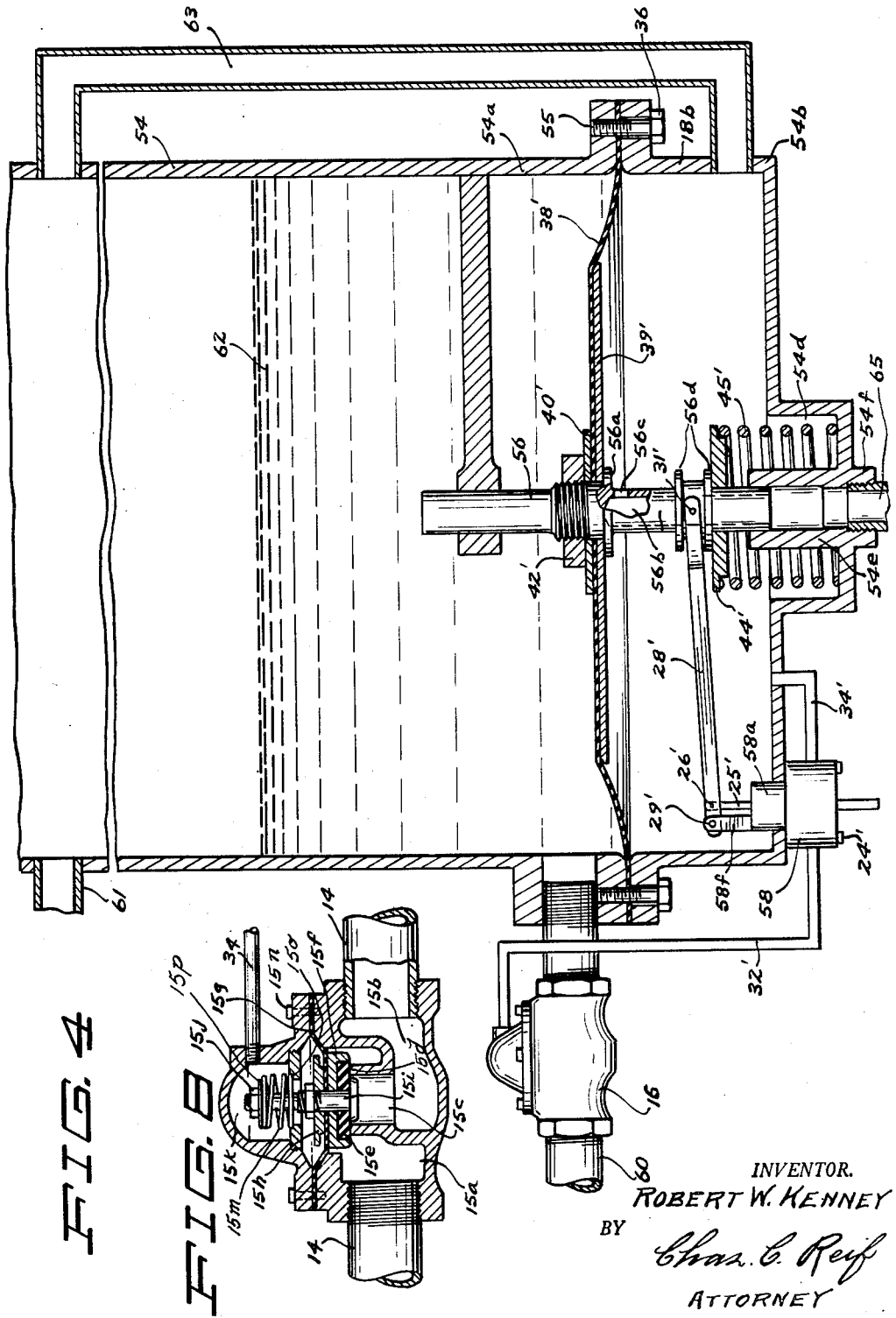

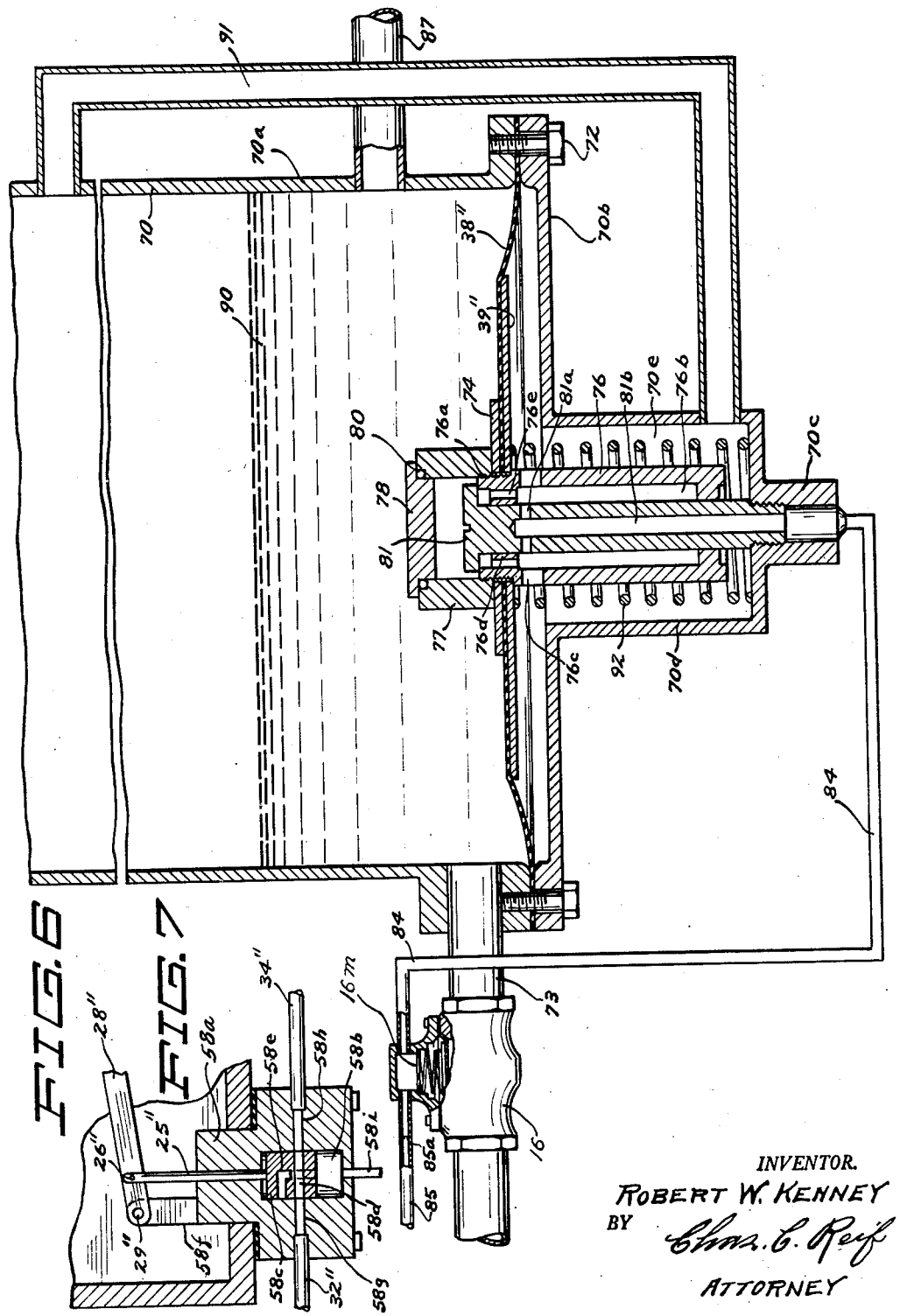

United States Patent Office 2,803,263
Patented Aug. 20, 1957

2,803,263

FLUID ACTUATED CONTROL MEANS

Robert W. Kenney, South Pasadena, Calif., assignor to Stanley G. Harwood, South Pasadena, Calif.

Application December 6, 1952, Serial No. 324,576

4 Claims. (Cl. 137—406)

This invention relates to a control means and particularly to a fluid or liquid-operated control means. While the control means could have various applications, one practical use of the same is to control the amount of fluid or liquid in a receptacle so that said amount can be held between desired limits.

It is an object of this invention to provide a control means for controlling the amount of liquid in a tank or receptacle, which means is actuated by the weight of the liquid in said tank or receptacle whereby the force used in actuating the control means can vary between wide limits and is not limited to a certain amount as in a float control.

It is also an object of the invention to provide a liquid-operated control means comprising a receptacle adapted to contain liquid, means for supplying liquid to said receptacle, a conduit for discharging liquid from said receptacle, means for controlling one of said conduits to prevent or permit discharge therethrough comprising a chamber having pressure therein, said pressure operating to cause said second mentioned means to prevent or permit passage of liquid through said conduit, a diaphragm disposed to be acted upon by the weight of liquid in said receptacle, and means actuated by said diaphragm when moved by said weight of liquid for controlling the pressure in said chamber and causing said second mentioned means to operate and permit or prevent passage of liquid through said one conduit.

It is a further object of the invention to provide such a control means as set forth in the preceding paragraph, together with a yielding means acting on said diaphragm to move the same in a direction opposite to that in which it is moved by said weight of liquid. When sufficient liquid has been discharged from said receptacle and the pressure in said receptacle above said diaphragm is lowered, said resilient means will move said diaphragm upward, pressure will again be raised in said chamber and operate said second mentioned means to control the flow of liquid through said conduit.

It is also an object of the invention to provide a control means which may be used in many places, including a tank or storage vessel for liquid, and said control comprises a receptacle adapted to contain fluid or liquid, together with a diaphragm disposed so that it will be pressed upon by the head or weight of the liquid thereabove. A fluid or liquid lighter than the fluid or liquid above the diaphragm is supplied to said receptacle below said diaphragm. A fluid or liquid lighter than the fluid or liquid pressing on the diaphragm is also preferably supplied to said receptacle above the heavier fluid or liquid which presses upon said diaphragm. A conduit connects the lighter fluid or liquid which is above the heavier fluid or liquid to the lighter fluid or liquid below the diaphragm. A supply conduit and a discharge conduit are provided for said receptacle for supplying and discharging the heavier fluid or liquid. One of these conduits is controlled by a valve comprising a pressure chamber the pressure in which acts to hold said valve in its various positions. A second valve is provided and this is operated by means actuated by said diaphragm when moved by the weight or head of said heavier liquid. Said second valve acts to supply fluid to said pressure chamber, to supply or drain a fluid therefrom so that the flow of fluid or liquid in said conduit having said first mentioned valve therein will be controlled.

It is more specifically an object of this invention to provide a control means for controlling the amount of liquid in a receptacle comprising a receptacle adapted to contain liquid, a conduit for discharging liquid from said receptacle, a valve in said conduit comprising a chamber in which pressure is produced for holding said valve in closed position, means for supplying liquid to said receptacle, a diaphragm disposed to be pressed upon by the head of liquid in said receptacle to move said diaphragm in one direction, resilient means acting to move said diaphragm in the opposite direction when the head of liquid in said receptacle falls to a certain point, a second valve, a second conduit connected to said second valve and to said receptacle, a third conduit connected to said chamber and to said second valve, a fourth conduit for discharging liquid from said second valve, and means actuated by said diaphragm when moved by said head of liquid for operating said second valve and connecting said third and fourth conduits therethrough to reduce pressure in said chamber and operate said first mentioned valve to permit flow of liquid from said receptacle through said first mentioned conduit, or said last mentioned means could act to connect said second and third conduits and increase pressure in said chamber and operate said first mentioned valve to prevent flow of liquid from said receptacle through said first mentioned conduit.

These and other objects and advantages of the invention will be fully set forth in the folowing description made in connection with the accompanying drawings in which like reference characters refer to similar parts throughout the several views and in which:

Fig. 1 is a view of said control partly in front elevation and partly in vertical section, some parts being broken away;

Fig. 2 is a central vertical section through a portion of the structure shown in Fig. 1 and shown on an enlarged scale;

Fig. 3 is a central vertical section through a portion of the structure shown in Fig. 1, some parts being shown in side elevation, said figure being on an enlarged scale;

Fig. 4 is a view partly in central vertical section and partly in front elevation showing a modification;

Fig. 5 is a central vertical section through a conduit and valve shown in Fig. 4, the same being shown on an enlarged scale;

Fig. 6 is a view similar to Fig. 2 showing a valve structure;

Fig. 7 is a partial view in central vertical section of a modified structure, a portion being shown in side elevation; and Fig. 8 is a central longitudinal view through a modified form of valve shown, some parts being shown in side elevation.

Referring to the drawings, and particularly Figs. 1 and 2, a tank or vessel 10 is shown adapted to contain liquid 11. Vessel 10 may represent various kinds of liquid-holding tanks or it may represent a water tower or reservoir adapted to contain liquid within which it is desired to control the amount of liquid between certain limits. A conduit 12 is shown for discharging liquid from vessel 10, and a conduit 14 is shown through which liquid can be supplied to vessel 10. A valve 16 is shown in conduit 14, the same acting to control said conduit and to prevent or permit the flow of liquid therethrough. While valve 16 could take various forms, one form thereof is shown in Fig. 5. As shown in Fig. 5, valve 16 has end portions threaded to receive the threaded ends of the portions of conduits 14. Valve 16 has a chamber 16a which communicates with a second chamber 16b through an opening 16c in a wall of said valve. A valve seat 16d surrounds opening 16c at its top and is adapted to be engaged by a plate valve member 16e which will be made of some yielding material, such as rubber or rubber composition. Valve 16e is carried in a plate 16f and a diaphragm 16g of flexible material overlies plate 16f and is engaged on its upper side by a second plate 16h. Diaphragm 16g is clamped between plates 16f and 16h by a headed bolt 16i having threaded thereon a nut 16j. Diaphragm 16g extends across the bottom of a chamber 16k and is clamped at its edge portion between parts of the casing of valve 16 by spaced bolts 16n. Valve 16 has chamber 16k above diaphragm 16g and a compression coiled spring 16m is disposed above plate 16h and engages the top of said plate at its lower end. At its upper end, spring 16m engages the top wall of valve 16. A conduit 34 leads from chamber 16k.

A receptacle 18 is shown which is adapted to contain fluid or liquid, and a conduit 20 connects receptacle 18 and vessel 10. A second valve 21 is provided, and while this might take various forms, one form thereof is shown in Fig. 2. Valve 21 comprises a portion 21a which is shown as cylindrical and extending through a cylindrical opening in the bottom of the casing 18b. A gasket 22 is preferably disposed between the bottom of receptacle portion 18b and a portion of the valve 21 below portion 21a. Valve 21 is secured to receptacle 18 by a plurality of headed bolts 24 threaded into the bottom of receptacle 18. Valve 21 has a chamber 21b therein in which is movable a piston 21c. Piston 21c has a passage 21d extending transversely therethrough and has another passage 21e of right angular form extending from one side of said piston through the bottom thereof. Piston 21c has secured thereto a rod 25 which extends upwardly through portion 21a and is pivotally connected at its upper end by a pivot 26 to a lever 28. Lever 28 is fulcrumed on a pivot member 29 carried in a bracket 21f upstanding from portion 21a. Lever 28, as shown in Fig. 3, is forked or bifurcated at its other end and has portions 28a disposed at each side of a cylindrical portion 30a of a rod 30. Portions 28a are pivotally connected to portion 30a by the pivot members 31. Valve 21 has passages 21g and 21h extending from chamber 21b in opposite directions and being in axial alignment. The passage 21d is adapted to be moved into and out of alignment with passages 21g and 21h. A conduit 21i extends from the bottom of chamber 21b and forms a discharge conduit for valve 21. Passage 21e is adapted to be moved where it aligns with passage 21h and with conduit 21i as shown, and it can be moved to a position out of alignment with passage 21h. A conduit 32 is connected to valve 21 and is in alignment with and communicates with passage 21g. Conduit 32 extends to and communicates with conduit 14. A conduit 34 is secured to valve 21 and is in alignment with and communicates with passage 21h. Conduit 34 extends to the pressure chamber 16k in valve 16.

Referring to Figs. 1 and 3, it will be seen that receptacle 18 has an upper portion 18a and a lower portion 18b having mating flanges which are connected by a plurality of circumferentially headed bolts 36. A diaphragm 38 is disposed between said flanges and clamped therebetween. Diaphragm 38, which will be made of some flexible durable sheet material, overlies a plate 39 which is bored to receive a portion 30b of rod 30 and rests upon a flange 30c formed on said rod. A smaller plate 40 overlies diaphragm 38. Rod 30 passes through plate 40 and diaphragm and said diaphragm is clamped between plates 39 and 40 by a nut 42 threaded on portion 30b. Rod 30 has an upper reduced portion 30d which is slidable in the bore of a bracket 18c secured to the inner side of portion 18a. The portions 28a are disposed between spaced flanges 30e on rod 30 and the lower flange 30e is engaged at its bottom by a plate 44. Plate 44 has a portion of reduced diameter at its lower side about which is disposed the upper end of a compression coiled spring 45, the lower end of which is shown as engaging the bottom of a recess or well 18d extending centrally from the bottom of portion 18b. A block 18e upstands from the bottom of recess 18d and is bored to receive the lower cylindrical end 30f of rod 30, the same acting as a guiding means for portion 30f. Receptacle 18 has a conduit 46 extending from the top thereof and communicating at its other end with vessel 10. Conduit 46 is secured in a boss 18f upstanding from the top of receptacle 18. A conduit 48 communicates with conduit 46 and at its other end communicates with receptacle portion 18b below diaphragm 38. Vessel 10 has therein above the level of the liquid 11 a lighter fluid, such as air, and this will be supplied to the receptacle 18 above the level of liquid therein. This lighter fluid, such as air, will also be supplied to receptacle portion 18b below diaphragm 38 by conduit 48.

In operation of the device shown in Figs. 1 to 3, liquid, such as water, is supplied to vessel 10 through conduit 14. When this liquid reaches a certain height, it will flow through conduit 20 into receptacle 18 above diaphragm 38 and its top will have the same level as the level of liquid in vessel 10. As the liquid rises in vessel 10 it is transmitted through tube 20 to receptacle 18. The higher the liquid rises in receptacle 18, the greater will be the weight on diaphragm 38. When the weight of the liquid becomes great enough to compress spring 45, diaphragm 38 will be moved downwardly against the pressure of spring 45, which latter will be compressed. When diaphragm 38 moves downwardly, it moves rod 30 downwardly and this swings lever 28 about its fulcrum 29 and rod 25 is moved downwardly. Rod 25 moves piston 21c downwardly. Before the diaphragm was moved downwardly, passage 21e in the piston of valve 21 was aligned with passage 21h, as shown. With the parts in this position, any fluid in pressure chamber 16k will pass through conduit 34, through passages 21h and 21e, and will be discharged through conduit 21i. With the pressure in chamber 16k reduced, pressure under disk 16d and diaphragm 16g forces valve 16e upward, thus opening valve 16 and allowing liquid to pass through conduit 14 into vessel 10. The liquid in conduit 14 is under pressure.

When diaphragm 38 moves downwardly and piston 21c is moved downwardly as described, the pressure from conduit 14 will pass through conduit 32, through passages 21g, 21d and 21h, and through conduit 34 to pressure chamber 16k. Pressure will now build up in chamber 16k and spring 16m plus the pressure in said chamber will force diaphragm 16g downwardly, thus closing valve 16. The supply of water to vessel 10 through conduit 14 is thus cut off. Water will flow out of vessel 10 through conduit 12 and when sufficient liquid or water has drained out of vessel 10, the water above conduit 20 will drain out of receptacle 18 and the weight of water above the diaphragm will be reduced so that spring 45 will move rod 30 and diaphragm 38 upwardly again to the position shown in Figs. 2 and 3. Lever 28 is moved and rod 25 is moved upwardly. Piston 21c is moved upwardly to the position shown in Fig. 2. Liquid can now flow from pressure chamber 16k, through conduit 34, through passages 21h and 21e and out through conduit 21i. The pressure will again be reduced in chamber 16k and pressure under disk 16d and diaphragm 16g will force valve 16e upwardly, compressing spring 16m, thus opening valve 16. The liquid in conduit 14 is under pressure. Liquid can again pass through conduit 14 into vessel 10, and this liquid will rise in vessel 10 until it reaches the desired height and enough of it flows into receptacle 18 to again move diaphragm 38 downwardly as above described, and again close valve 16. The amount of water delivered to vessel 10 is thus nicely controlled. Receptacle 18 will of course be placed at the desired point on vessel 10 so that when sufficient water passes thereinto to move diaphragm 38, the supplying of water to vessel 10 will be cut off.

In Fig. 4 a somewhat modified form of the apparatus is shown. A receptacle 54 is shown in which the amount of liquid, such as water, will be regulated. Receptable 54 comprises upper and lower portions 54a and 54b having outwardly extending peripheral flanges at their adjacent ends which are connected by a plurality of circumferentially spaced bolts 55. The diaphragm 38' similar to diaphragm 38 is clamped between said flanges by the bolts 55. Said diaphragm has a plate 39' therebelow and has a smaller plate 40' overlying the same. A rod 56 extends through plates 39' and 40' and through diaphragm 38', the same having a collar 56a thereon engaging the lower side of plate 39'. A nut 42' is threaded on rod 56 and clamps members 39', 38' and 40' together. Rod 56 below collar 56a is in the form of a tube, the same having a passage 56b therethrough. An opening 56c is provided in rod 56 below collar 56a so that the inner side of the tube thus communicates with the chamber below diaphragm 38'. Rod 56 has spaced collars 56d thereon and a lever 28' has a fork or bifurcated end, the sides of which embrace the portion of rod 56 between collars 56d and are pivotally connected to said portion by pivot members 31'. Lever 28' is pivoted adjacent its other end by a pivot 29' to a bracket 58f upstanding from a portion 58a of a valve 58. Valve 58 is similar to valve 21 in every respect except that passage 21d shown in valve 21 is below passage 21e. Valve portion 58a extends through the bottom of portion 54b of receptacle 54 and a gasket 22' is disposed between portion 58a and the lower enlarged portion of valve 58. Valve 58 is secured to receptacle 54 by a plurality of headed bolts 24'. Valve 58 has a chamber 58b therein in which is movable a piston 58c. Piston 58c is connected to a rod 25' which is pivotally connected to lever 28' by a pivot 26'. Piston 58c has a passage 58d extending transversely therethrough and also has a passage 58e which is of right angular form and extends from one side of piston 58c to the bottom thereof. A conduit 58i extends from the bottom of chamber 58b to without valve 58 and forms a discharge conduit. Valve 58 has spaced axially aligned passages 58h and 58g at each side of chamber 58b. A conduit 32' is secured to valve 58 and communicates with passage 58g. A conduit 34' is secured to the opposite side of valve 58 and communicates with passage 58h. As shown in Fig. 4, passage 34' commmunicates with the chamber in receptacle 54 below diaphragm 38'. The parts of valve 58 having the letters following the numeral 38 are the same as the parts in valve 21 having the same letters following the numeral 21. Conduit 32' extends to the chamber 16k in a valve 16 which is disposed in a conduit 60 which forms a discharge conduit for receptacle 54. It may be stated that receptacle 54 is supplied with a heavy liquid, such as water, through a conduit 61. Above this liquid or water 62 receptacle 54 will contain a lighter fluid, such as gasoline. A similar lighter fluid, such as gasoline, will be supplied to receptacle 54 below diaphragm 38'. A conduit 63 extends from the upper portion of receptacle 54 above liquid 62 to the chamber in said receptacle below diaphragm 38'. A plate 44' is secured to rod 56, the same engaging the lower side of lower collar 56d. Plate 44' has a lower portion reduced in diameter about which extends the upper end of a compression coiled spring 45' which thus engages plate 44'. The other end of spring 45' engages the bottom of a well or recess 54d formed in the bottom of portion 54b. A block 54e extends upward from the bottom of recess 54d and is bored to receive the lower end of rod 56 which extends below plate 44'. A bore in block or stud 54e extends downwardly through the bottom of well 54d and through a boss 54f on the bottom of portion 54b. The bore in portions 54e and 54f is closed at its bottom by a threaded ring 65.

In operation, diaphragm 38' will normally be in its upper position. At this time lever 28' is in the position shown in Fig. 4 and piston 58c is in the position shown in Fig. 6. Fluid will now pass from the chamber below diaphragm 38', through conduit 34', through passages 58h, 58d and 58g to conduit 32', and then to valve chamber 16k in valve 16 disposed in conduit 60. This will cause pressure in chamber 16k and valve 16 will be held in closed position as above described. The heavier liquids, such as the water 62, will rise in receptacle 54 to the desired point, at which time the weight or head of said liquid will overcome spring 45' and diaphragm 38' will be moved downwardly. This will move rod 56 downwardly, thus swinging lever 28' downwardly, and moving rod 25' downwardly. This will move piston 58c and passage 58d will be moved downwardly out of alignment with passages 58g and 58h and passage 58e will move into alignment with passage 58g. Liquid can now flow from valve chamber 16k through conduit 32' and through passages 58g and 58e and then downwardly through passage 58i to the atmosphere. Pressure is thus reduced in chamber 16k. The heavier liquid, such as water 62, will now flow out through conduit 60 and valve 16. When sufficient water has drained from receptacle 54, spring 45' will move rod 56 upwardly and this will move diaphragm 38' to its former or upper position. This swings lever 28' and raises rod 25'. Piston 58c is moved upwardly and passage 58d is again moved into alignment with passages 58g and 58h. Liquid from below diaphragm 38' can now flow through conduit 34', passages 58h, 58d, 58g, through conduit 32' to pressure chamber 16k in valve 16. Pressure is again built up in chamber 16k and this pressure plus the pressure of spring 16m will force diaphragm 16g downwardly again closing valve 16. Water can now again be delivered to receptacle 54 until diaphragm 38' is again moved downwardly. Opening 56c forms an air vent.

In Fig. 6 another modification is shown. A receptacle 70 is shown having an upper part 70a and a lower part 70b, said parts having outwardly extending flanges connected by headed bolts 72. A diaphragm 38" is disposed between said flanges and clamped between portions 70a and 70b by the screws 72. A conduit 73 extends from receptacle 70 and has therein a valve 16 similar in all respects to the valve 16 shown in Fig. 5. A plate 39" is disposed below diaphragm 38" and a smaller plate 74 overlies diaphragm 38". A member 76 has a reduced threaded portion 76a extending centrally through diaphragm 38", plate 39" and plate 74, and has threaded thereon a cylindrical member 77 which clamps members 38", 39" and 74 together, plate 39" engaging a shoulder formed on member 76 by portion 76a. A cover 78 is shown for member 76a and a gasket or O-ring 80 is disposed between said cover 78 and a portion of member 77. A headed member 81 extends through member 76 and has a lower reduced threaded end threaded into a boss 70c projecting downwardly from a cylindrical portion 70d depending from the bottom of portion 70b and having therein a chamber or well 70e. The head of member 81 is disposed in member 77 and engages the top of member 76. Member 76 has a portion 76d adjacent its upper end having a plurality of passages 76e extending therethrough. Member 81 has an axial bore 81b therein for the greater part of its length, and passages or ports 81a extend from said bore 81b to the outer side of member 81 and thus communicate with a passage 76b in member 76. Passages 76c extend outwardly from chamber 76b to the outer side of member 76 and communicate with the chamber in portion 70b below diaphragm 38". A conduit 84 extends from the passage in boss 70c, which passage communicates with the bore in member 81, and said conduit extends to a pressure chamber 16k in valve 16. Valve 16 is in all respects identical with the valve 16 shown in Fig. 5 except the conduits connected thereto. Another conduit 85 extends from chamber 16k at the side thereof opposite conduit 84, and conduit 85 will be connected to a low pressure chamber or zone, such as the suction side of a pump not shown. Conduit 85 has a restricted orifice 85a therein. A compression coiled spring 92 is disposed in chamber 70e, the same engaging the bottom of chamber 70e at its lower end and engaging the bottom of plate 39″ at its upper end. The receptacle 70 will have supplied thereto through a conduit 87 a heavy liquid, such as water. Said receptacle above said liquid or water 90 will contain a lighter fluid, such as gasoline. The chamber in receptacle 70 or portion 70b thereof below diaphragm 38″ will also contain a lighter fluid, such as gasoline. An equalizer conduit 91 connects the chamber above the water 90 in receptacle 70 to the lower portion of chamber 70e in portion 70d.

In operation, with the parts in the position shown in Fig. 6, there is insufficient water in receptacle 70, which may be a sump, storage tank or other chamber under pressure in which liquid is to be regulated, to move diaphragm 38′ downwardly against the pressure of spring 92. Water is being supplied to receptacle 70 and as the level of the water 90 rises, the lighter fluid above said water flows through equalizer conduit 91 to chamber 70e below diaphragm 38″. The chamber above diaphragm 38″ is under pressure and this pressure is transmitted through conduit 91 to chamber 70e below diaphragm 38″. Liquid now flows from chamber 70e, through the ports or openings 76c and 81a to the bore 81b in member 81, and through conduit 84 to pressure chamber 16k, through conduit 85 and the orifice 85a to the low pressure chamber or zone to which conduit 85 is connected. Orifice 85a restricts the flow sufficiently to cause a build-up of pressure in chamber 16k. This pressure holds diaphragm 16g downwardly in the position shown in Fig. 6 and valve 16 is thus maintained closed. When sufficient water has collected in receptacle 70, the weight or head thereof will force diaphragm 38″ downwardly against the pressure of spring 92. Member 76 is moved downwardly and this moves portion 76d downwardly and cuts off or closes ports 81a. Closing of the ports 81a shuts off the flow of fluid through conduit 84 and the fluid in pressure chamber 16k drains out through conduit 85 and orifice 85a so that the pressure in chamber 16k is reduced. With the pressure in chamber 16k reduced, pressure under disk 16d and diaphragm 16g forces valve 16e upward, thus opening valve 16. Water is now discharged from receptacle 70 through conduit 73. Water continues to be discharged until the head or weight of the water above diaphragm 38″ is less than the pressure of spring 92. Spring 92 will then force diaphragm 38″ upwardly and member 76 moves therewith so that ports 81a are again opened. Liquid will now again flow through ports 81a, through bore 81b and through conduit 84 to pressure chamber 16k. Pressure will again build up in chamber 16k and this pressure will move diaphragm 16g downwardly and again close valve 16. Water 90 will again accumulate in receptacle 70 until the head or weight thereof moves diaphragm 38″ as above described.

In Fig. 8 a modified form of the valve 16 is shown. This valve 15 will replace the valve 16 shown in Figs. 1, 4 and 6. Said valve 15 has end portions adapted to receive the connected conduit, such as conduit 14. Valve 15 has a chamber 15a which communicates with a second chamber 15b through an opening or passage 15c in a wall of said valve. A valve seat 15d surrounds opening 15c at its top and is adapted to be engaged by a plate valve member 15e which will be made of some yielding material, such as rubber or rubber composition. Valve 15e is carried in a plate 15f and a diaphragm 15g of flexible material overlies plate 15f and is engaged on its upper side by a second plate 15h. Diaphragm 15g is clamped between plates 15f and 15h by a headed bolt 15i having threaded thereon a nut 15j. Diaphragm 15g extends across the bottom of chamber 15k and is clamped at its edge portion between parts of the casing of valve 15 by spaced bolts 15n. Valve 15 has a chamber 15k above diaphragm 15g and a compression coiled spring 15m is disposed in chamber 15k, said spring having its bottom engaging a plate 15o secured in the casing of valve 15. The top of spring 15m engages a plate 15p surrounding rod 15i and held thereon by a nut 15j. The conduit 34 is connected to valve 15 and communicates with chamber 15k.

In operation, valve 15 will function in a manner similar to valve 16 except that the valve will be moved to closed position only by the pressure in chamber 15k. When the pressure in chamber 15k is reduced, the valve will be moved to open position, both by the pressure in the conduit 14 or the conduit 60 and by spring 15m. Spring 15m therefore acts to open the valve.

From the above description it will be seen that I have provided a control operated by a fluid or liquid for controlling various forms of apparatus, such as controlling the accumulation of liquid in a chamber, such as a storage tank, sump or other chamber. The control can be made to operate under various pressures of the fluid or liquid and therefore can be arranged to be very positively operated. It will be seen that the operating force can be varied and the control operated with different weights, heads or pressures of fluid or liquid. The control mechanism is simple and it is obvious that the control will have the capacity of being used in many applications. The control has been amply demonstrated in actual practice, found to be very successful and efficient, and steps are being taken for its commercial manufacture.

It will of course be understood that various changes may be made in the form, details, arrangement and proportions of the parts, without departing from the scope of applicant's invention, which generally stated, consists in a device capable of carrying out the objects above set forth, in the parts and combinations of parts disclosed and defined in the appended claims.

What is claimed is:

1. A control means having in combination, a receptacle for containing a liquid, a diaphragm in said receptacle extending thereacross adapted to be responsive to the pressure of said liquid and be moved in one direction thereby, yielding means in said receptacle acting on said diaphragm to move it in the opposite direction when said pressure is below a certain amount, a conduit connected to said receptacle, a valve intermediate said conduit controlling the same and comprising a chamber adapted to contain fluid under pressure acting to hold said valve closed, a second valve, a conduit connecting said second valve and said chamber, a third conduit connected to said second valve for discharging liquid, a fourth conduit connected to said receptacle and to said second valve, means in said receptacle operatively connected to said diaphragm for operating said second valve to connect said second and third conduits when said diaphragm is moved by said pressure to reduce the pressure in said chamber and thereby opening said first mentioned valve, said last mentioned means operating said valve to connect said second and fourth conduits for raising the pressure in said chamber and closing said first mentioned valve when said diaphragm is moved by said yielding means.

2. A control means having in combination, a receptacle to contain a fluid, a diaphragm in said receptacle extending thereacross responsive to the pressure of said fluid to move in one direction, a second fluid above said fluid and lighter than the same, a third fluid below said diaphragm also lighter than said first mentioned fluid, a conduit connecting the portion of said receptacle above said first mentioned fluid to the portion below said diaphragm, a second conduit connected to said receptacle, a valve intermediate said second conduit, said valve including a chamber for containing a fluid under pressure and a valve in said receptacle actuated by movement of said diaphragm in one direction for connecting said chamber with said third mentioned fluid in said receptacle to supply pressure to said chamber for closing said first mentioned valve and said valve in said receptacle connecting said chamber to the atmosphere for opening said first mentioned valve when actuated by movement of said diaphragm in the opposite direction.

3. A receptacle for containing liquid, a conduit connected to said receptacle, a valve intermediate said conduit including a chamber to contain fluid under pressure, a diaphragm in said receptacle extending thereacross and having a shaft secured thereto, said shaft being responsive to the pressure of liquid in said receptacle, a fluid lighter than said liquid above said liquid in said receptacle, a fluid lighter than said liquid below said diaphragm in said receptacle, a second conduit connecting said receptacle below said diaphragm and said chamber, a valve intermediate said second conduit, a lever in said receptacle connecting said shaft and said valve for controlling said valve to provide communication between said chamber and said receptacle.

4. The structure set forth in claim 3, a third conduit extending from said second mentioned valve to the atmosphere, said lever also actuating said valve to connect said second and third conduits for communication between said chamber and the atmosphere to reduce the pressure in said chamber and open said first mentioned valve.

References Cited in the file of this patent

UNITED STATES PATENTS

| | | |
|---|---|---|
| 792,275 | Rochefoucauld et al. | June 13, 1905 |
| 824,143 | Reeve et al. | June 26, 1906 |
| 876,497 | Senter | Jan. 14, 1908 |
| 1,004,629 | Cook | Oct. 3, 1911 |
| 2,064,962 | Waters | Dec. 22, 1936 |
| 2,171,394 | Christian | Aug. 29, 1939 |
| 2,327,601 | Kent | Aug. 24, 1943 |
| 2,586,410 | Williams | Feb. 19, 1952 |
| 2,616,440 | Mason | Nov. 4, 1952 |
| 2,664,170 | Walker | Dec. 29, 1953 |